United States Patent [19]
Davis et al.

[11] Patent Number: 5,943,407
[45] Date of Patent: Aug. 24, 1999

[54] PERFORMANCE ENHANCEMENT OF TONE DETECTION AND FSK DETECTION USING HYBRID ECHO CANCELLATION

[75] Inventors: Paul Joseph Davis, Chesterbrook; Vasu Iyengar, Allentown; James A. Johanson, Emmaus; James Charles Popa, North Whitehall Township, Lehigh County; Richard Ubowski, Harleysville, all of Pa.

[73] Assignee: Lucent Techologies Inc., Murray Hill, N.J.

[21] Appl. No.: 08/991,482

[22] Filed: Dec. 16, 1997

[51] Int. Cl.[6] .............................. H04M 1/56; H04M 3/42; H04M 1/00

[52] U.S. Cl. ......................... 379/142; 379/215; 379/411; 379/392

[58] Field of Search ..................................... 379/406, 409, 379/410, 411, 347, 215, 142, 93.23, 390, 352, 373, 376

[56] References Cited

U.S. PATENT DOCUMENTS

| | | |
|---|---|---|
| 5,172,408 | 12/1992 | Petty et al. .............................. 379/390 |
| 5,263,084 | 11/1993 | Chaput et al. . |
| 5,420,921 | 5/1995 | Lahdemaki ............................... 379/406 |
| 5,600,714 | 2/1997 | Eppler, Jr. et al. ...................... 379/406 |
| 5,836,009 | 11/1998 | Diamond et al. ........................ 379/215 |

*Primary Examiner*—Paul Loomis

[57] ABSTRACT

Type 2 caller ID/call waiting (CIDCW) customer premises equipment (CPE) is provided which has a greatly improved method of detecting tones indicating the availability of call information regarding an incoming call while the customer premises equipment is in an off-hook condition. A hybrid echo canceler (HEC) algorithm is added to the customer premises equipment (CPE) to suppress the signal from the microphone of the customer premises equipment from being included in the signal analyzed for the presence of tones. Thus, the microphone of the customer premises equipment need not be muted upon detection of the alerting CAS tone sequence in a Caller ID service. The HEC algorithm runs substantially continuously in a preferred embodiment, and may be combined with a conventionally operating HEC which cancels reflections due to the hybrid or telephone line interface.

22 Claims, 4 Drawing Sheets

PERFORMANCE ENHANCEMENT OF TONE DETECTION AND FSK DETECTION USING HYBRID ECHO CANCELLATION

BACKGROUND OF THE INVENTION

1. Field of the Invention

This invention relates to the enhanced detection of non-voice information on a telephone line. More particularly, it relates to the suppression of voice signals at off-hook customer premises equipment to allow detection of call information regarding an incoming third party call while in an off-hook condition, e.g., the alerting CAS tone, FSK and other Caller ID information.

2. Background of Related Art

Call information is useful to users of a telephone system. For example, a well known and popular call information service provided in the United States is Calling Identity Delivery (Caller ID). This service typically provides the telephone number and household name information of a calling party to the called party before the call is answered. Based on a display of the call information, the called party may decide not to answer the incoming call. Basic call information such as Caller ID information is transmitted from the local telephone company to the called party while the called party's phone is in a hung-up or on-hook state, e.g., between the first and second rings.

Another telephone company service which has become well known and popular is that which allows a third party to call while the telephone is off-hook, currently implemented in the United States in Call Waiting services provided by telephone companies. Call waiting allows someone who is already using the telephone (i.e., in an off-hook state), to receive an audible interruption, click or other indication at the customer premises equipment that another person is calling, and then to establish a connection with the third party caller without hanging up on the first party.

More recently, call information has been combined with third party caller services to provide an advanced service currently known as Calling Identity Delivery on Call Waiting (CIDCW) in the United States. CIDCW service allows a customer, while off-hook on an existing call, to receive information about an incoming calling party on a waited call before answering that incoming call waiting call. Transmission of the third party's call information with this service takes place almost immediately after the customer premises equipment (CPE) is alerted to the new call with a CPE Alerting Signal (CAS) which is a short burst of a combination of high frequencies that are appended to the Subscriber Alerting Signal (SAS) otherwise known as the 'Call Waiting Tone'. Using CIDCW, a user can decide whether or not to take the incoming call waiting call.

Customer premises equipment capable of receiving on-hook call information such as Caller ID (CID) including Calling Number Delivery (CND) and Calling Name Delivery (CNAM), is generally referred to as Type 1 customer premises equipment. Type 1 customer premises equipment additionally capable of receiving call information when off-hook or already in an established call with another party (CIDCW) is generally referred to as a Type 2 customer premises equipment. With either Type 1 or Type 2 customer premises equipment and Caller ID service, the called party is alerted to the availability of call information for an incoming call waiting call with an alerting CAS tone. The alerting CAS tone is acknowledged with a DTMFD, and the FSK data corresponding to the call information follows from the central office to the customer premises equipment.

In the United States, FSK call information such as Caller ID generally is not transmitted in conventional schemes by the central office unless an acknowledge (ACK) signal is received from the customer premises equipment. Of course, the call information may be transmitted without implementation of an acknowledge signal. In any event, in order to prevent the customer premises equipment from hearing the audible ACK and FSK call information signals, the central office silences the far-end party's voice path before providing the alerting CAS sequence. Likewise, the customer premises equipment mutes the handset (or microphone and speaker of a speakerphone) before sending the ACK signal. The customer premises equipment sends FSK caller ID call information using the signaling protocol described in Bellcore recommendation TR-NWT-000030. Upon completion of the transmission of the FSK call information, or if no ACK signal is received by the central office from the customer premises equipment, the central office restores the far-end party's talking path. The customer premises equipment restores handset (or microphone and speaker) operation upon completion of the reception of the FSK call information.

At any time after a called party having CIDCW service has been alerted to the availability of call information for an incoming call waiting call and while a party is still in the waited state, CIDCW allows the customer to flash the switch hook to retrieve the waited call, and subsequently to go back and forth between the current far-end party and the held party by flashing. CIDCW provides all the capabilities associated with the current CW service, with the additional capability of providing CID data to a customer on waited calls. Therefore, CIDCW is considered an enhancement of the CW service. A telephone line may either have call waiting (CW) or CIDCW service enabled, but not both at the same time.

In the on-hook condition, there is little concern about a user hearing the alerting CAS tones or subsequent FSK data because the phone is not being used when the call information is being transmitted. Moreover, there is no concern over frequencies of a conversation interfering with their detection because there is no conversation transmitted when the telephone is on-hook. Thus, the detection of the call information in Type 1 customer premises equipment is relatively straight forward and can be performed simply by a detection algorithm in a digital signal processor (DSP) at the customer premises equipment.

The more difficult situation arises in Type 2 customer premises equipment because the telephone is off-hook, i.e., is carrying a conversation or other information between at least two parties. Thus, it is very possible for voice signals of the conversation to clash with and be disrupted by the alerting CAS tones indicating the availability of call information for an incoming call waiting caller. This causes an annoyance to the user at the customer premises equipment of hearing the alerting CAS tones in the earpiece or speakerphone. Most of this annoyance is conventionally avoided by switching out the earpiece or speakerphone for the remaining portion of the alerting CAS tones and FSK data upon detection by the customer premises equipment. While this causes an interruption in the conversation between the original two parties, it is rather brief and the conversation resumes after the call information is received by the customer premises equipment.

However, the more serious concern is the ability of the Type 2 customer premises equipment to accurately and reliably detect the alerting CAS tones while in an off-hook condition. CIDCW requires the detection of the alerting CAS tones in the possible presence of near-end speech at the customer premises equipment because the customer premises equipment does not know a priori when the alerting CAS tones are coming. FIG. 3 shows the approximate long-term average spectral energy density for continuous speech, showing that high relative spectral energy is present in near-end speech, which is in the same general range as the alerting CAS tones used to transmit call information such as Caller ID. The presence of speech adds complexity to algorithms employed to detect the alerting CAS tones and, in fact, can cause a false detect or non-detect of an alerting CAS tone signal. Thus, conversation can interfere significantly with the alerting CAS tones at the customer premises equipment, causing erroneous detection of the alerting CAS tones, and erroneous reception of the call information such as a telephone number and household name of the incoming call waiting party.

CIDCW data is received when a telephone is off-hook (i.e., in use). To guarantee that the frequency shift keying (FSK) data transmitted after the alerting CAS tones by the central office are not corrupted by conversation, Bellcore recommendation FSD 01-02-1090 suggests muting of the microphone at the customer premises equipment upon detection of the alerting CAS tone sequence, and maintaining the muting until the call information for the call waiting caller is received. Conventional CIDCW customer premises equipment follows the Bellcore recommendation FSD 01-02-1090 (which, in its entirety, is explicitly incorporated herein by reference). For instance, U.S. Pat. No. 5,263,084 and other conventional systems mute the microphone at the customer premises equipment by switching the microphone out of electrical connection with the customer premises equipment upon detection of the alerting sequence of CAS tones.

FIG. 4 shows a conventional customer premises speakerphone 500. In FIG. 4, a telephone line from a central office 518 interfaces with the telephone line interface (TLI) 514 (otherwise known as a 'hybrid') of the customer premises equipment. The TLI 514 shows the required impedance and isolation to the telephone line, e.g., typically about 50 ohms DC impedance and about 600 ohms AC impedance, according to current standards in the United States. Of course, the invention is equally applicable to customer premises equipment operating on a telephone line conforming to standards of other countries.

In this conventional speakerphone, both the speaker 564 and the microphone 562 are electrically switched out upon detection of the alerting CAS tones. Switches 454a and 454b switch the microphone 562 and speaker 564, respectively, out of electrical connection to prevent conversation or voice from corrupting the signal analyzed by the alerting CAS tone functional block 510 while the subsequent call information such as alerting CAS tones and Caller ID FSK data are transmitted.

The DSP 511 includes a CAS tone detection and FSK call information algorithm (CAS tone functional block) 510 and other functionality (not shown) for providing the functions of a conventional speakerphone. A tone detector 510b and a frequency shift keying (FSK) demodulator 510a, respectively detect the alerting CAS tones and subsequent FSK data containing the call information. A tone generator 510c provides return information to the central office 518.

In operation, DSP 511 receives a signal from the telephone line via the hybrid or TLI 514 and a codec 512. An A/D and D/A converter within the DSP 511 can be used to replace the codec 512 in cost sensitive applications. An audio echo canceler (AEC) algorithm 592 in the DSP 511 helps avoid the possibility of feedback of audio from the speaker 564 reflecting off walls in the room and back into the microphone 562 causing undesirable squealing and other uncomfortable noise. The AEC algorithm 592 suppresses audio picked up by the microphone 562 which was output from the speaker 564, eliminating or minimizing acoustic feedback. The AEC algorithm 592 is an adaptive, speech trained acoustic echo canceler, and is under the control of a host processor. The DSP 511 may double as a host processor, or a separate microcontroller, microprocessor, or other processor may serve as a host processor for the customer premises equipment. The amount of acoustic echo cancellation provided by the AEC algorithm 592 is monitored by the DSP 511 and adjusted as necessary for optimal performance of the speakerphone.

The audio signal is passed to the speaker 564 from the DSP 511 through codec 560. Similarly, the audio signal from the microphone 562 is passed to the DSP 511 through the codec 560. The switches 454a and 454b are controlled by the DSP 511 or other host processor to electrically disconnect the microphone 562 from the DSP 511 upon the detection of call information such as an alerting CIDCW CAS tone, and for the duration of the reception of subsequent FSK call information, e.g., call waiting caller ID information.

Thus, conventional systems require the microphone of a handset or a speakerphone to be disconnected, switched out of electrical connection with the DSP, or otherwise muted to allow accurate detection of the CIDCW FSK data. This switching out of the microphone prevents the optimization of the detection of the alerting CAS tones until the alerting CAS tones are first detected. The microphone cannot be muted until after the alerting CAS tone is detected. Thus, the alerting CAS tone is necessarily analyzed with underlying voice data included. Accordingly, in the face of high energy, near-end voice, the detection of the alerting CAS tones must be detected in the face of possible voice conversation frequencies. Therefore, conventional Type 2 customer premises equipment undesirably requires additional switching mechanisms which complicate the hardware and software of the customer premises equipment, require additional operational steps in receiving call information such as Caller ID information for a waiting caller, require more complicated host processor software and hardware, and otherwise decrease the reliability of the customer premises equipment.

SUMMARY OF THE INVENTION

In accordance with the principles of the present invention, a method and means to receive call information regarding a third party is provided. The customer premises equipment continuously suppresses a microphone signal from a representation of a telephone line signal, and detects an alerting tone or call information in the microphone signal-suppressed telephone line signal.

Customer premises equipment comprises a telephone line interface, a processor, and a handset including a microphone element and a speaker element. First A/D and D/A converters are connected between the telephone line interface and the processor, while second A/D and D/A converters are connected between the processor and the microphone and speaker elements. A suppression device suppresses a microphone signal from a signal input to a detection algorithm to better detect tones from the central office.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
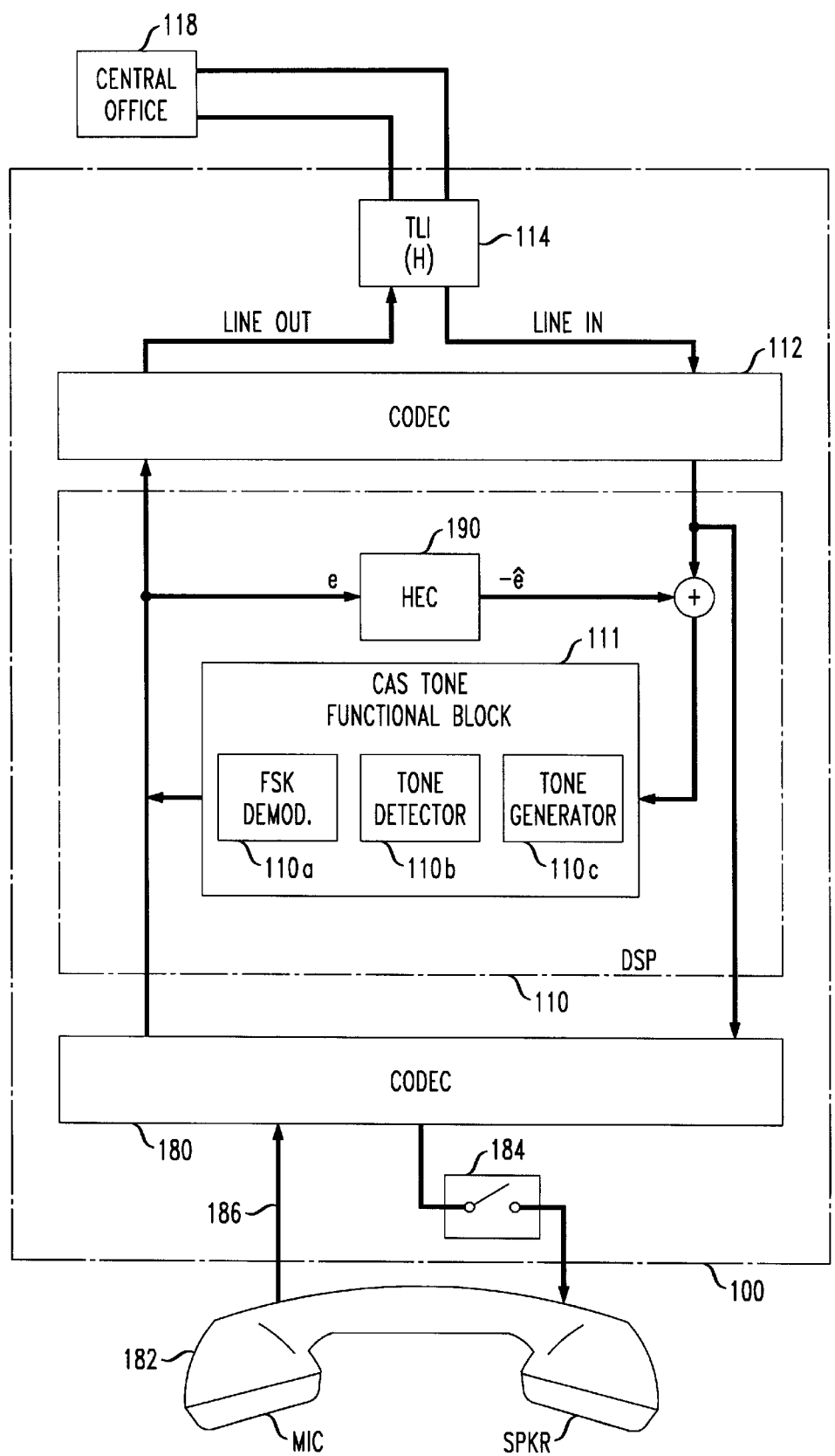
FIG. 1 shows a customer premises handset according to an embodiment of the present invention.

FIG. 1 shows an exemplary embodiment of a customer premises handset according to the principles of the present invention. Although the exemplary embodiments of the present invention relate to the reception of Caller ID information as it is currently known in the United States, it is recognized that the present invention relates generally to the reception of call information relating to a calling party while customer premises equipment is in an off-hook condition.

In FIG. 1, instead of connecting a handset 182 directly to a TLI 114 as in the prior art, the present invention passes the signals to and from the handset 182 through a codec 180 connected to a DSP 110.

The signal from microphone MIC is not muted by the present invention, but rather is continuously suppressed from the input of a tone detection algorithm, e.g., CAS tone detection algorithm 111, by a hybrid echo canceler 190. In this way, the detection of call information in an off-hook condition, e.g., an alerting CAS tone and subsequent FSK data, is greatly improved.

In particular, a TLI 114 is connected to a telephone line from a central office 118. The TLI 114 provides the necessary isolation and impedance to the telephone line. For instance, in the off-hook state, the TLI 114 shows a nominal DC impedance of 50 ohms and approximately 600 ohms AC impedance to the telephone line.

Figure 4:
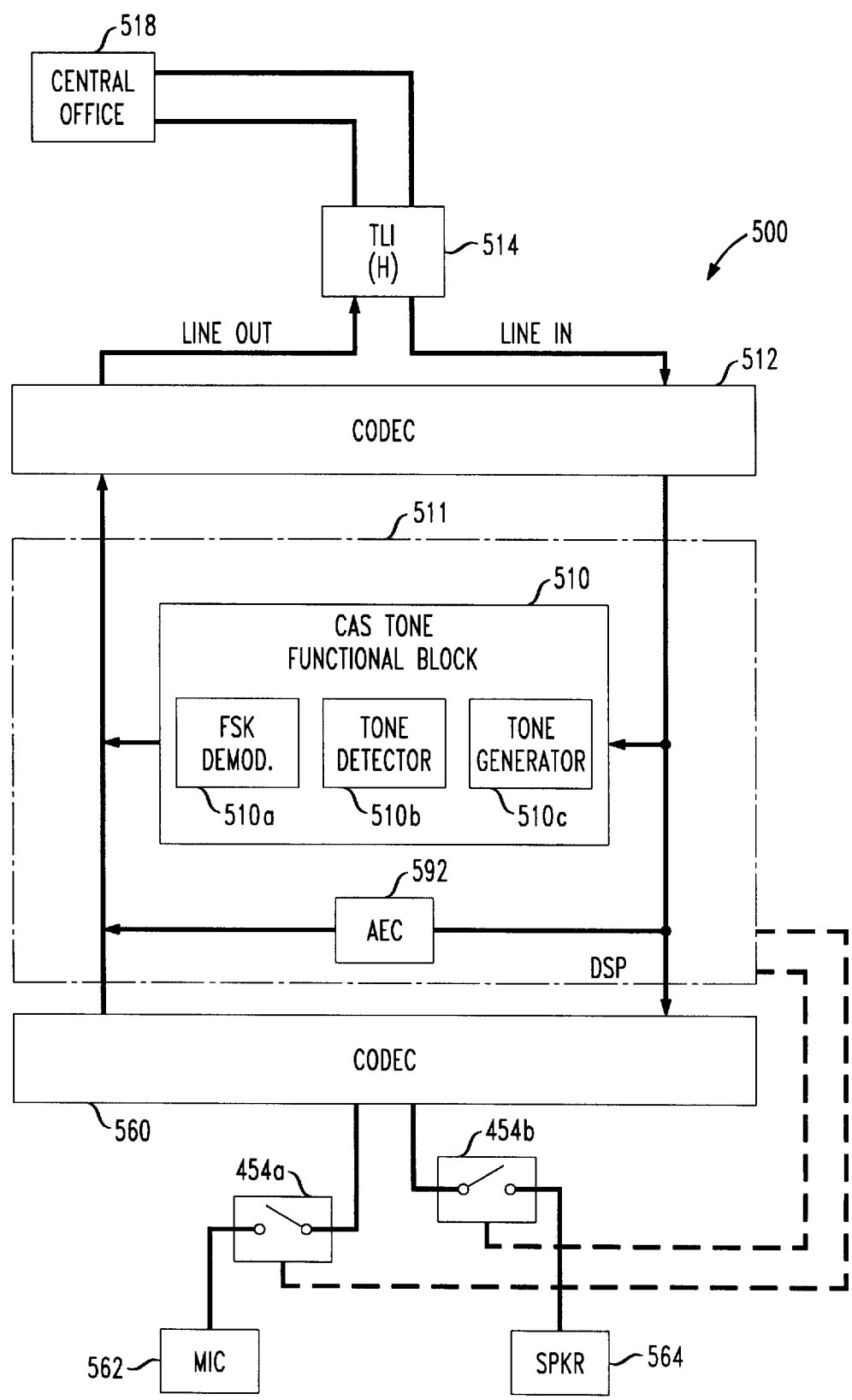
FIG. 4 shows a prior art speakerphone

The codec 112 converts between analog signals on the telephone line and digital signals for the DSP 110. DSP 110 includes a CAS tone detection and FSK caller ID information algorithm 111 which includes an FSK demodulator 110a, a tone detector 110b, and a tone generator 110c, as in the prior art system shown in FIG. 4. However, the DSP 110 also includes a hybrid echo canceler (HEC) algorithm 190 to aid in the detection of the alerting CAS tone signal on the incoming telephone line without having to mute the microphone MIC. Analog-to-digital (A/D) and digital-to-analog (D/A) functionality in the DSP 110 may alternatively be utilized instead of the codecs 112, 180.

The HEC algorithm 190 performs a hybrid echo cancellation of the signal from the microphone MIC input to the CAS tone detection and FSK caller ID information algorithm 111. The hybrid echo cancellation performed by the HEC algorithm 190 is performed continuously, i.e., at all times in this embodiment. However, the hybrid echo cancellation performed by the HEC algorithm 190 may alternatively be performed only during the time that the call information, e.g., the alerting CAS tones and subsequent FSK caller ID data is being received and analyzed by the CAS tone detection and FSK caller ID information algorithm 111. The HEC 190 function of suppressing the signal from microphone MIC may be selectively enabled and disabled in the customer premises equipment 110 depending upon the availability of a CIDCW service.

The HEC algorithm 190 is an adaptive, speech trained hybrid echo canceler. The amount of cancellation provided by the HEC algorithm 190 is monitored by the DSP 110 and/or host processor and adjusted as necessary to ensure accurate detection of the alerting CAS tones from the central office without disruption by a microphone signal from microphone MIC.

The signal from the microphone MIC is not switched or otherwise muted according to the principles of the present invention. Rather, the signal from the microphone MIC is continually suppressed by the HEC algorithm 190 from the signal input to the CAS tone detection and FSK caller ID information algorithm 111. The signal from the microphone MIC is input directly to the DSP 110 rather than through the TLI 114 to provide the ability for the DSP 110 to process a raw input microphone signal so that the HEC algorithm 190 sees the input microphone signal as leakage through the TLI 114 and essentially subtracts the input microphone signal from the signal input to the CAS tone detection and FSK caller ID information algorithm 111.

The signal to the speaker SPKR is switched out by switch 184 upon detection of the alerting signal, e.g., a sequence of CAS tones indicating that call information, e.g., Caller ID information is to be received from the central office, when the customer premises handset 182 is off-hook (in use). Switch 184 is shown as a separate element in FIG. 1, but alternatively may be included within the DSP 110, codec 180 or other element at the customer premises equipment.

The HEC algorithm 190 is separate and distinct from any hybrid echo cancellation performed at the customer premises equipment due to the hybrid or TLI 114. It is entirely possible and desirable that the DSP 110 may include an optional additional hybrid echo canceler function for the purpose of canceling any leakage signal or echo from the TLI 114 or central office 118. In this conventional use of a hybrid echo canceler, the optional HEC function can utilize approximately a 13 millisecond (ms) buffer to handle any echo caused by an electrical reflection caused as far away as the central office 118. This optional HEC function is focused on characteristics of the hybrid or TLI 114, and its goal is to knock down the transmitted signal at the receive pin of the TLI 114. The functions of the optional, additional HEC function may be combined with the functions of the HEC algorithm 190 in accordance with the principles of the present invention to form a single hybrid echo cancellation algorithm.

The inventive use of the microphone signal-suppressing HEC algorithm 190 suppresses the signal from the microphone MIC input to the CAS tone functional block 111. About 30 to 35 decibels (dB) has been found to be an effective amount of suppression.

The HEC algorithm 190 suppresses a signal from the codec 180, which is physically very close to the DSP 110, and therefore a significantly short buffer in HEC algorithm 190 is sufficient to suppress the signal from the microphone MIC. The HEC algorithm 190 includes an adaptive filter which constricts the reflected impulse response from the microphone MIC. The HEC algorithm 190 builds the adaptive filter with actual input from the microphone MIC, and thus is 'voice adaptive.' However, the adaptive filter of the HEC algorithm 190 may be based on other impulse response criteria such as bursts of noise.

Figure 2:
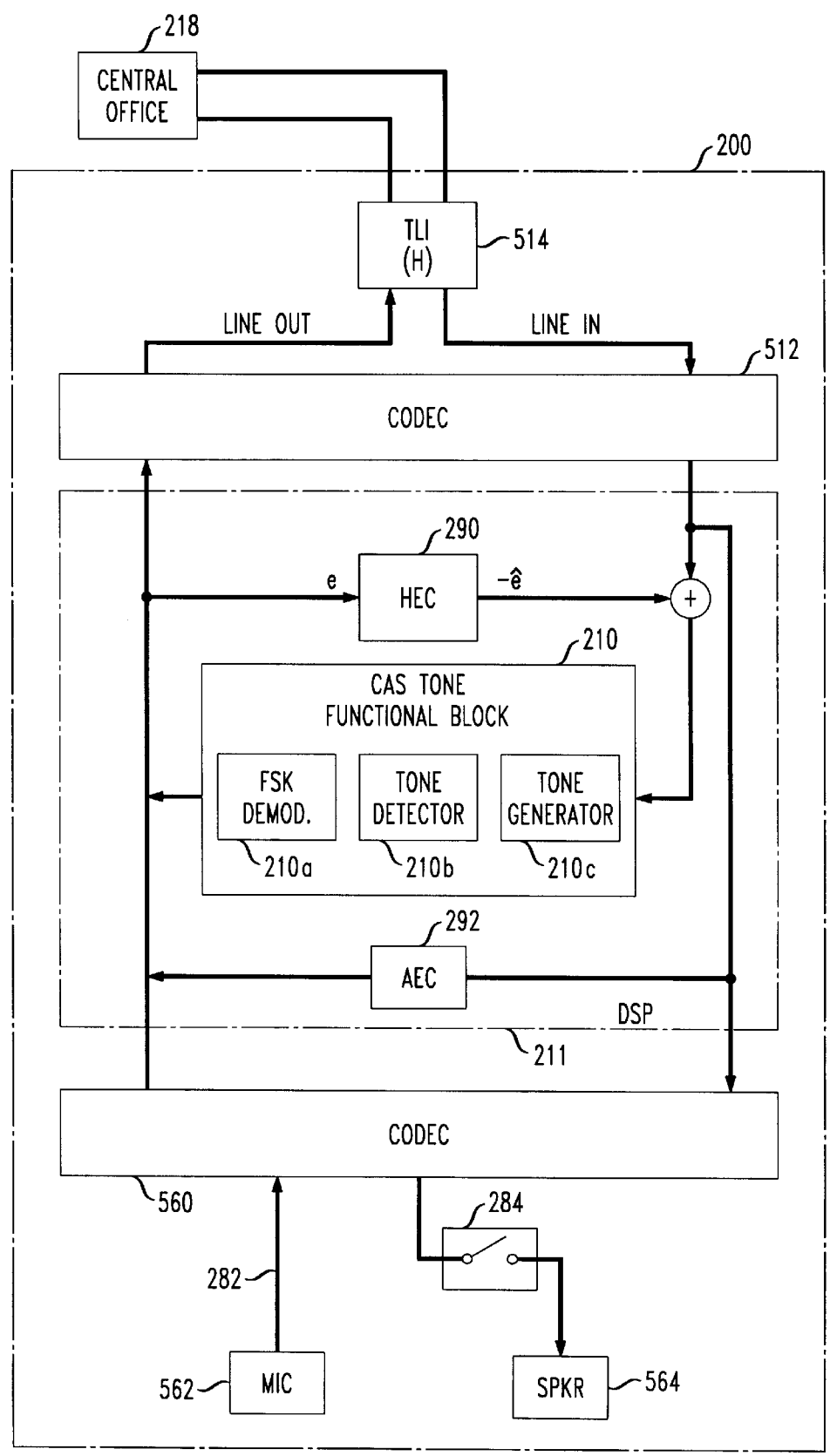
FIG. 2 shows a customer premises speakerphone according to another embodiment of the present invention.
Figure 3:
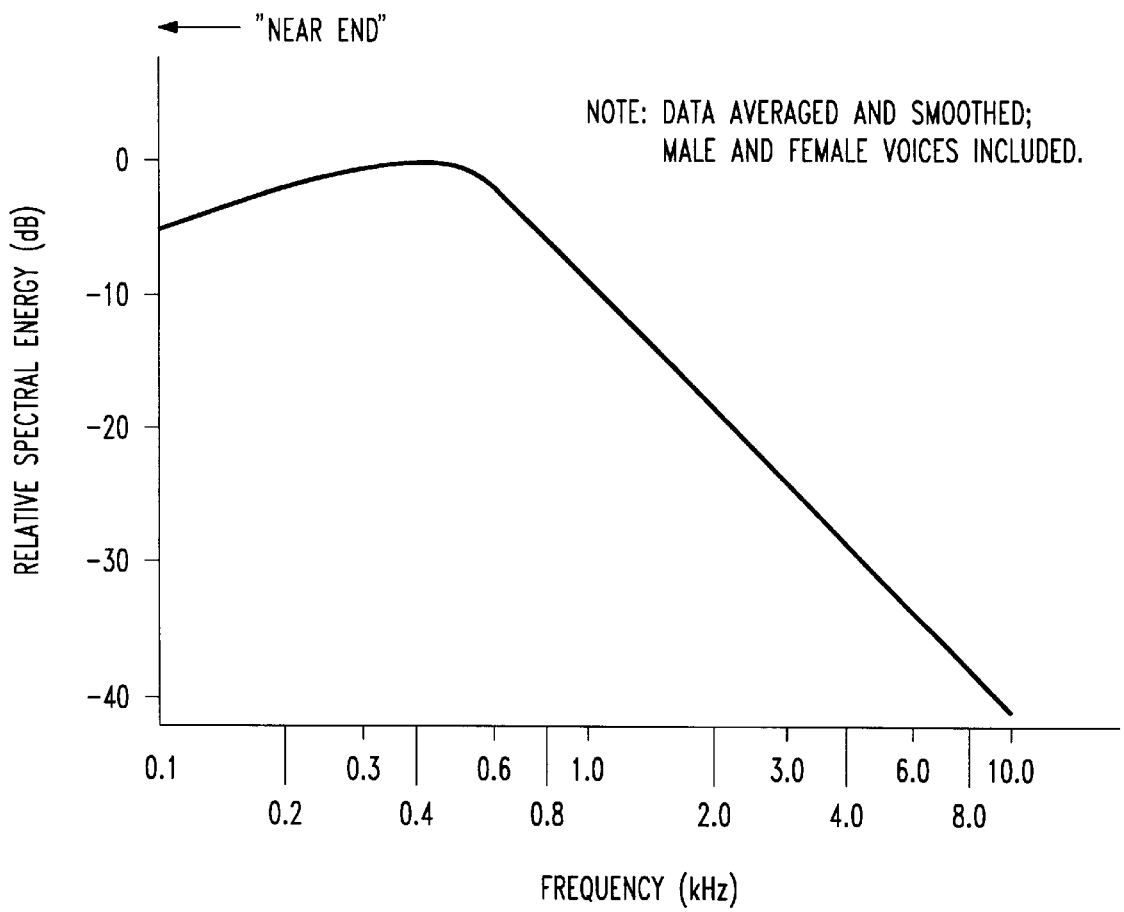
FIG. 3 shows the approximate long-term average spectral energy density for continuous speech.

FIG. 2 shows an exemplary embodiment of a customer premises speakerphone 200 in accordance with the principles of the present invention. Notably, the microphone 562 of the speakerphone 200 can be connected directly to the codec 560 and DSP 211 without being switched out electrically upon detection of call information such as the alerting CAS tones of Caller ID services.

The customer premises speakerphone 200 advantageously includes a hybrid echo canceler 290 to suppress the signal from the microphone 562 input to the speakerphone 200 from being included in the signal analyzed by the CAS tone functional block 210 as in the embodiment shown in FIG. 1. However, the speakerphone 200 further includes an audio echo canceler (AEC) 292 to suppress acoustic echos in the telephone signal.

The customer premises speakerphone 200 shown in FIG. 2 further includes a TLI 514, codecs 512, 560 and a speaker 564. The speaker 564 is electrically switched out by switch 284 upon detection of call information in an off-hook condition. However, as in the case of the embodiment shown in FIG. 1, the microphone 562 is NOT electrically switched out or otherwise muted according to the present invention. Instead, the signal from the microphone 562 is suppressed on the order of, e.g., 30 to 35 dB by a hybrid echo canceler 290 for input to the CAS tone functional block 210.

The CAS tone functional block 210 includes an FSK demodulator 210a, a tone detector 210b, and a tone generator 210c. The DSP 211 further includes an echo canceler algorithm which suppresses or eliminates acoustic echos, as represented by acoustic echo canceler (AEC) algorithm 292. The AEC algorithm 292 is focused on the cancellation of acoustic reflection paths, e.g., a first path from the speaker 564 to the microphone 562, and a second path being based on reflections from objects such as walls of the environment in which the customer premises equipment 200 resides. The AEC algorithm 292 typically comprises a 30 ms buffer corresponding to an approximately 15 foot round trip distance (30 foot total) to walls or other surfaces in the room. This buffer may also encompass an acoustic reflection off a ceiling (e.g., 8 foot above the customer premises equipment), and from the round trip of a typical distant telephone call, e.g., a perfect telephone call from New York to Los Angeles, 3,000 miles each way. Because of the significant amount of buffered information necessary for the AEC algorithm 292 to operate based on the multiple acoustic echo paths, the AEC algorithm 292 includes a very large adaptive filter which constricts the reflected impulse response from the speaker 564 output. The AEC algorithm 292 builds the adaptive filter with actual input, and thus is 'voice adaptive.'

There are many benefits to employing a hybrid echo canceler to suppress the signal from a microphone from a signal to be analyzed for call information such as that required by CIDCW Type 2 customer premises equipment to detect an alerting CAS tone sequence and subsequent FSK Caller ID information. This allows reliable detection of the alerting CAS tone. Moreover, the complications of muting the microphone at the customer premises equipment is not required, and the talkdown/talkoff performance of a CAS tone algorithm in the DSP is more robust.

While the invention has been described with reference to the exemplary preferred embodiments thereof, those skilled in the art will be able to make various modifications to the described embodiments of the invention without departing from the true spirit and scope of the invention.

We claim:

1. A method of receiving call information at off-hook customer premises equipment, comprising:

suppressing a microphone signal from a representation of a telephone line signal; and detecting said call information in said microphone signal-suppressed telephone line signal.

2. The method of receiving call information at off-hook customer premises equipment according to claim 1, wherein:

said suppression of said microphone signal is substantially continuous.

3. The method of receiving call information at off-hook customer premises equipment according to claim 1, further comprising:

receiving caller ID data as said call information.

4. The method of receiving call information at off-hook customer premises equipment according to claim 3, wherein:

said microphone signal is suppressed in said representation of said telephone line signal even in an absence of said call information.

5. The method of receiving call information at off-hook customer premises equipment according to claim 1, wherein:

a hybrid echo canceler suppresses said microphone signal in said representation of said telephone line signal.

6. The method of receiving call information at off-hook customer premises equipment according to claim 1, further comprising:

detecting FSK data relating to said call information.

7. A method of receiving call information at off-hook customer premises equipment, comprising:

suppressing a microphone signal from a representation of a telephone line signal; and detecting an alerting CAS tone in said microphone signal-suppressed telephone line signal.

8. The method of receiving call information at off-hook customer premises equipment according to claim 7, wherein:

said suppression of said microphone signal is substantially continuous.

9. Apparatus to receive call information at customer premises equipment in an off-hook condition, comprising:

suppression means for suppressing a microphone signal from a representation of a telephone line signal; and detection means for detecting said call information in said microphone signal-suppressed telephone line signal.

10. Apparatus to receive call information at customer premises equipment in an off-hook condition according to claim 9, further comprising:

receiving means for receiving Caller ID data as said call information.

11. Apparatus to receive call information at customer premises equipment in an off-hook condition according to claim 9, wherein:

said suppression means suppresses said microphone signal in said representation of said telephone line signal even after said receiving means receives said call information.

12. Apparatus to receive call information at customer premises equipment in an off-hook condition according to claim 9, wherein said suppression means comprises:

a hybrid echo canceler algorithm.

13. Apparatus to receive call information at customer premises equipment in an off-hook condition according to claim 9, further comprising:

means for detecting FSK data relating to Caller ID information.

14. Customer premises equipment, comprising:

a telephone line interface;

a processor;

a microphone;

a speaker;

a first analog-to-digital converter and a first digital-to-analog converter connected between said telephone line interface and said processor;

a second analog-to-digital converter connected between said processor and said microphone, and a second digital-to-analog converter connected between said processor and said speaker;

a first hybrid echo canceler function to provide a microphone signal-suppressed signal; and a tone detection algorithm in said processor to detect call information in said microphone signal-suppressed signal.

15. The customer premises equipment according to claim 14, further comprising:

a second hybrid echo canceler function to provide a suppression of echo signals related to said telephone line interface.

16. The customer premises equipment according to claim 14, wherein said tone detection algorithm comprises:

a frequency shift keying demodulation routine; and a tone detector.

17. The customer premises equipment according to claim 14, further comprising:

an audio echo canceler to suppress acoustic echoes in said customer premises equipment.

18. Customer premises equipment, comprising:

a telephone line interface;

a processor;

a handset including a microphone element and a speaker element;

a first analog-to-digital converter and a first digital-to-analog converter connected between said telephone line interface and said processor;

a second analog-to-digital converter connected between said processor and said microphone element, and a second digital-to-analog converter connected between said processor and said speaker element;

a suppression device to suppress a signal from said microphone element in a signal representative of a telephone line signal to provide a microphone signal-suppressed signal; and a detection algorithm to detect tones in said microphone signal-suppressed signal.

19. The customer premises equipment according to claim 18, wherein said suppression device comprises:

a hybrid echo canceler algorithm.

20. The customer premises equipment according to claim 18, further comprising:

a second suppression device to suppress echo signals related to said telephone line interface.

21. The customer premises equipment according to claim 18, wherein said detection algorithm comprises:

a frequency shift keying demodulation routine; and a tone detector.

22. The customer premises equipment according to claim 18, further comprising:

an audio echo canceler to suppress acoustic echoes in said customer premises equipment.

* * * * *